United States Patent

Grykiewicz et al.

[11] Patent Number: 5,287,797
[45] Date of Patent: Feb. 22, 1994

[54] BREW BASKET

[75] Inventors: Shirdan J. Grykiewicz, Johnstown, Ohio; Douglas E. McKanna, Castro Valley, Calif.; Dean F. Rushmore, Marysville, Ohio

[73] Assignee: Nestec S.A., Vevey, Switzerland

[21] Appl. No.: 12,679

[22] Filed: Feb. 3, 1993

Related U.S. Application Data

[63] Continuation-in-part of Ser. No. 829,826, Feb. 3, 1992, abandoned.

[51] Int. Cl.⁵ .............................................. A47J 31/44
[52] U.S. Cl. ........................................ 99/295; 99/304; 210/477
[58] Field of Search ................. 99/295, 300, 304, 306, 99/307, 313, 314; 210/477, 478, 481, 482

[56] References Cited

U.S. PATENT DOCUMENTS

| | | | |
|---|---|---|---|
| D. 288,057 | 2/1987 | Webster | D7/400 |
| 3,374,897 | 3/1968 | Martin | 210/455 |
| 3,450,024 | 6/1969 | Martin | 99/295 |
| 3,490,356 | 1/1970 | Peterson et al. | 99/300 |
| 3,561,349 | 2/1971 | Endo et al. | 99/307 |
| 3,620,155 | 11/1971 | Bixby, Jr. | 99/295 |
| 3,793,935 | 2/1974 | Martin | 99/295 |
| 3,800,690 | 4/1974 | Molenaar et al. | 99/295 |
| 4,303,525 | 12/1981 | Stover | 210/455 |
| 4,642,190 | 2/1987 | Zimmerman | 210/464 |
| 4,739,697 | 4/1988 | Roberts | 99/295 |
| 4,860,645 | 8/1989 | Van der Lijn et al. | 99/295 |

FOREIGN PATENT DOCUMENTS

| | | | |
|---|---|---|---|
| 934178 | 9/1973 | Canada | 99/304 |
| 2172795 | 10/1986 | United Kingdom | 99/295 |

*Primary Examiner*—Harvey C. Hornsby
*Assistant Examiner*—Mark Spisich

[57] ABSTRACT

A brew basket is disclosed for use with conventional coffee makers of the type found in offices, hotels and restaurants. The brew basket is configured to receive ground coffee in the form of a compressed wafer and provides increased extraction of coffee solids from compressed coffee wafers and a significant reduction in extraction time. The basket has a relatively shallow profile and is dimensioned so that when the brew basket is mounted on the coffee maker, substantially the entire upper surface of the compressed wafer disposed in the brew basket is wetted by the hot water discharged from the spray head of the coffee maker. In addition the basket is dimensioned to maintain a water level in the brew basket sufficient to at least partially submerge the compressed wafer during extraction, to further increase extraction efficiency.

7 Claims, 3 Drawing Sheets

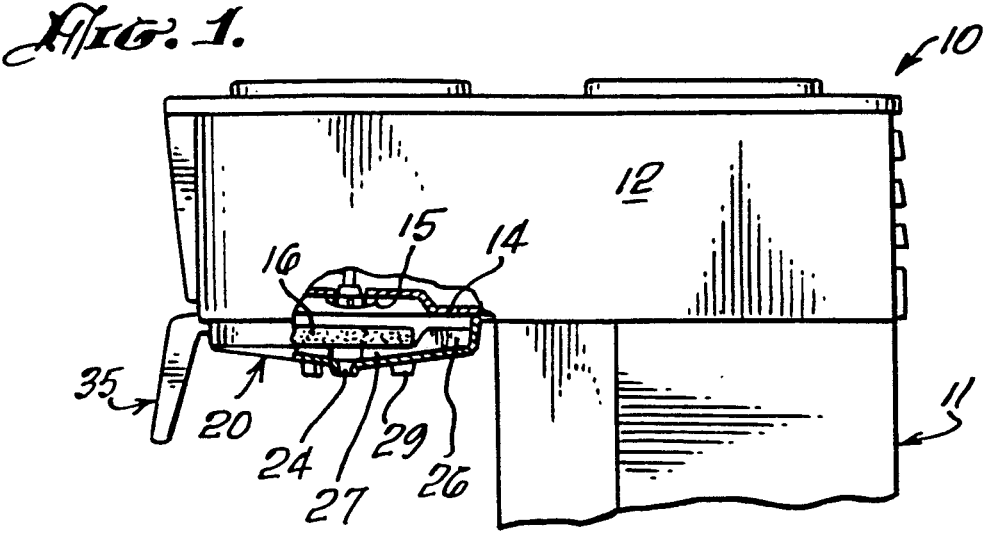
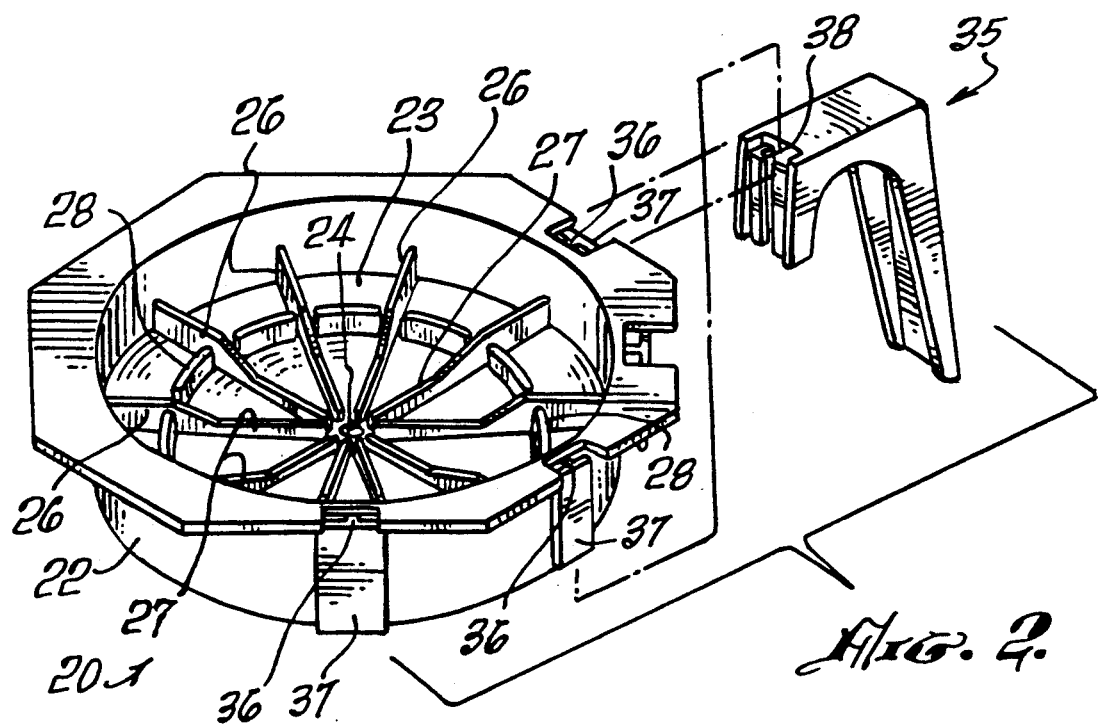

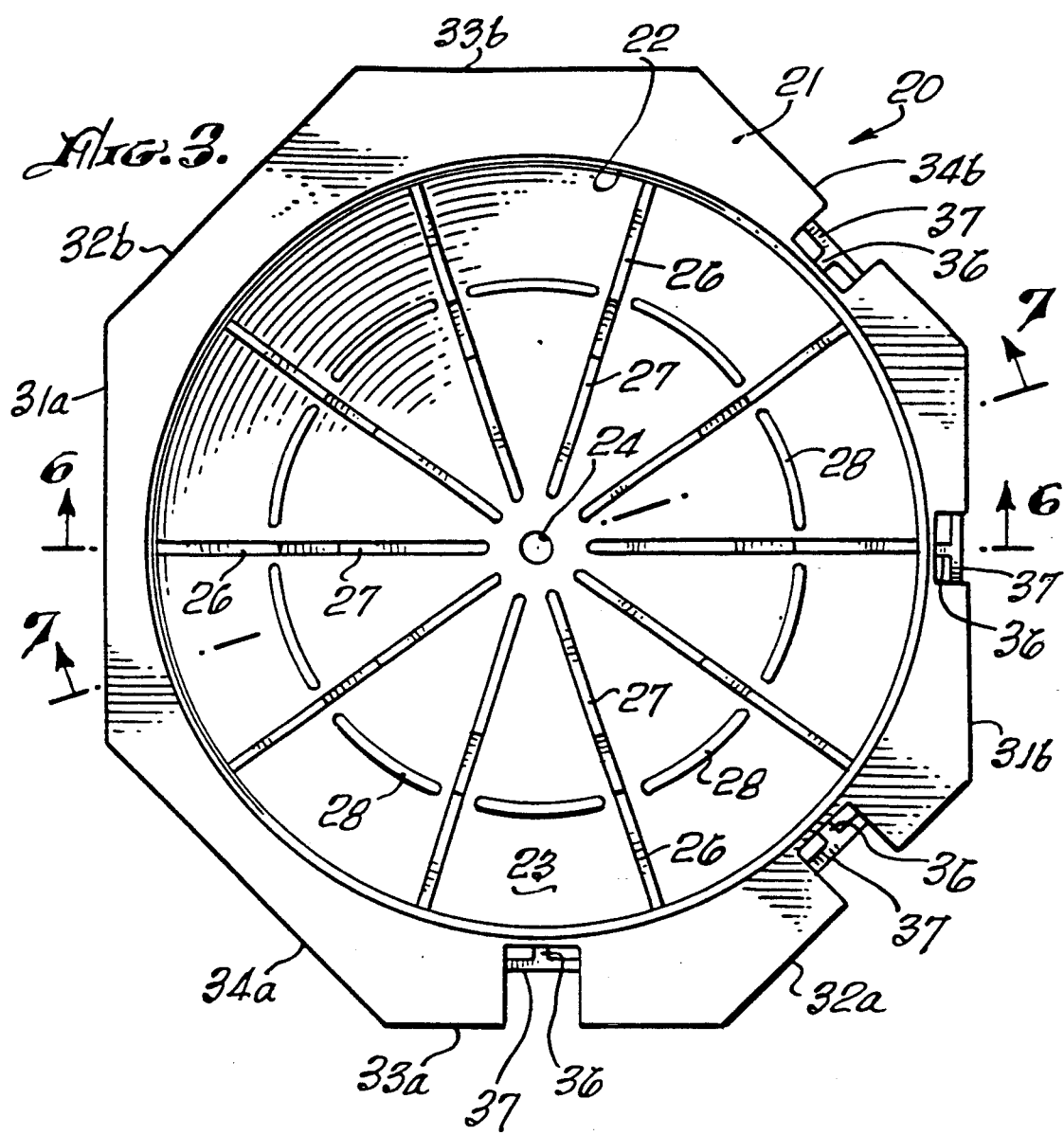
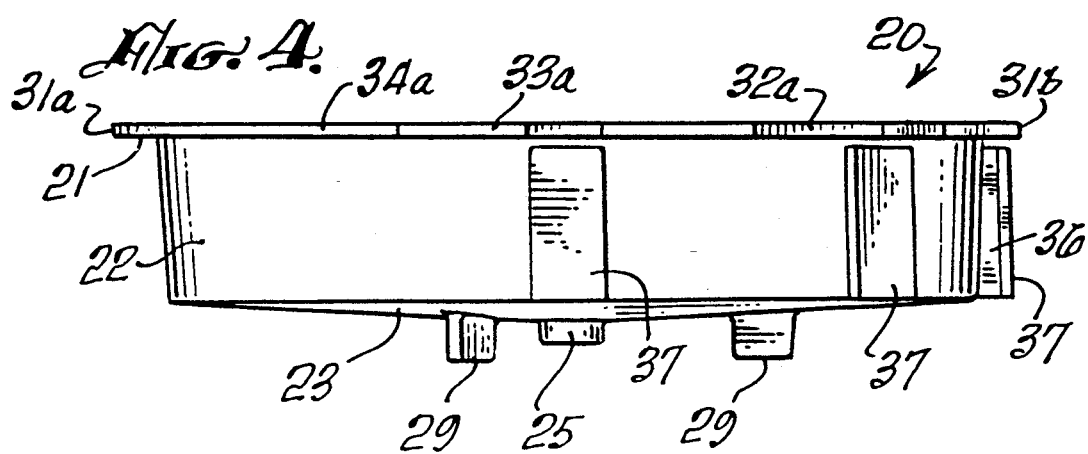

BREW BASKET

This application is a continuation-in-part of application Ser. No. 829,826, filed Feb. 3, 1992, abandoned.

This invention relates to a beverage brewing basket for a conventional coffee making machine. More particularly, the invention relates to a brew basket which is configured to receive a compressed wafer of ground coffee and is dimensioned to increase the extraction of coffee beverage from a compressed wafer of ground coffee disposed in the brew basket.

BACKGROUND OF THE INVENTION

Coffee making machines, in which hot water is supplied to infuse ground coffee, are widely used in food service establishments, such as offices, hotels and restaurants. In such coffee making machines a brew basket in which a pre-measured quantity of ground coffee is disposed, is slidably mounted on the bottom wall of an upper housing of the coffee maker directly below a spray head that discharges hot water from a heated tank within the device in a downwardly diverging conical pattern onto the ground coffee in the bottom of the brew basket. Typically, a pair of opposed guide brackets on the bottom wall of the upper housing of the coffee maker support the brew basket by means of a marginal rim around the upper edge of the basket so that the upper edge of the brew basket is centrally disposed under the spray head.

Usually, a conventional brew basket has a frustoconical shape, having a height of about 7 to 12 cm or more with the bottom wall of the basket being provided with an outlet for brewed coffee. Conventional brew baskets typically have several internal peripheral steps for supporting a filter paper cone on which the ground coffee to be infused is disposed. In the past, loose ground coffee has usually been used such coffee making machines, with the ground coffee either being transferred from a bulk container or from a pre-measured packet. Recently, in order to facilitate the use of such coffee makers and to reduce the inconvenience of handling and storing packages of loose ground coffee, tablets or wafers of compressed ground coffee have been developed, with such compressed wafers containing a pre-measured quantity of ground coffee. While convenient to use, such compressed coffee wafers have not been particularly well suited for use in conventional brew baskets of commercial coffee makers. Compressed coffee wafers, when placed in the bottom of a conventional brew basket, do not provide brewed coffee of equivalent strength to that obtained by use of the same amount of ground coffee in loose form. This has required persons who desire the convenience of use of compressed coffee wafers to accept coffee of less than a desired strength, or to use wafers containing additional amounts of ground coffee in an attempt to obtain brewed coffee of a desired strength.

SUMMARY OF INVENTION

The present invention is directed to a brew basket for conventional coffee makers which utilizes a compressed coffee wafer and is dimensioned to provide improved extraction of brewed coffee from the compressed wafer.

Such improved extraction from the compressed coffee wafer is obtained by constructing the brew basket to maintain the compressed wafer in such close proximity to the spray head of the coffee maker that hot extraction water discharged from the spray head contacts and wets substantially the entire upper surface of the wafer. In order to position the coffee wafer in such close proximity to the spray head, the brew basket of this invention is relatively shallow compared to conventional prior brew baskets, with the height of the circular sidewall of the brew basket being relatively small in relation to its diameter, typically having a height to diameter ratio of about 0.15–0.25 to 1. In addition, a series of integrally formed upstanding radial ribs are provided on the bottom wall of the brew basket, with the ribs having a height sufficient to position the upper surface of the compressed coffee wafer slightly below the upper edge of the circular sidewall of the brew basket. That is, the brew basket is dimensioned so that when the compressed wafer is disposed on the radial ribs in the basket and the brew basket mounted on a coffee maker, the distance between the upper surface of the wafer and the upper edge of the brew basket is equal to between about 0.20–0.25 times the diameter of the wafer. For example, for a coffee wafer 8.75 cm in diameter, the brew basket is dimensioned to place the upper surface of the coffee wafer from 1.8 to 2.2 cm from the spray head.

In addition, the brew basket is dimensioned so that the discharge of hot water from the coffee maker into the basket creates a water level in the basket sufficient to at least partially submerge the coffee wafer to further promote improved extraction of coffee solids from the wafer.

The brew basket of this invention may be used with a variety of conventional coffee maker machines used in food service applications, such as offices, hotels and restaurants, both those of the pour-over type and those directly plumbed to a water supply line. The brew basket has an outwardly extending flange or rim about the upper periphery of the side wall which is adapted to be slidably mounted in guide rails on the coffee maker housing to support the brew basket in position beneath the spray head of the coffee maker. In accordance with a preferred embodiment, the peripheral rim of the brew basket is polygonal in shape, having an even number of sides, typically six or eight, providing the brew basket with a plurality of parallel pairs of outwardly extending side rims which cooperate with the guide rails on the coffee maker to support the brew basket in position. Since the distance between the guide rails on different types of coffee makers may vary, each of the pair of opposing side rims of the brew basket have a different width to enable the brew basket to be used on various types and brands of coffee makers. A removable handle is slidably secured to the side wall of the brew basket at one of the pairs of opposing sides of the polygonal peripheral rim for placing the brew basket in and out of its operative position.

The compressed coffee wafers utilized in the brew basket of the present invention have a thickness of between about 0.5 cm to 1.3 cm. The coffee wafers preferably are circular in shape with the specific dimensions being determined primarily by the amount of roast and ground coffee in the wafer. That is, the wafers contain sufficient roast and ground coffee to provide brewed coffee beverage of the desired strength. This amount may vary depending upon the intended food service use of the wafer. For example, wafers intended for office coffee use typically contain between 30 g to 50 g of roast and ground coffee, with the circular wafer having a diameter of from about 7.6 to 10.2 cm and a thickness of between 0.5–1.3 cm. Wafers intended for use in restaurants typically contain between 50 g to 80 g of coffee, with the circular wafer having a diameter of between about 8.8 cm to 11.5 cm and a thickness of between 0.5–1.3 cm.

The compressed coffee wafers used in the brew basket are overwrapped in conventional filter paper, with the filter paper wrapper being sufficiently oversized to permit expansion of the coffee wafer upon extraction.

In addition to providing improved coffee extraction, the brew basket of this invention, when used in conjunction with compressed coffee wafers, provides a significant reduction in the time required to brew coffee beverage of a desired strength.

DESCRIPTION OF THE DRAWINGS

FIG. 1 is a side elevation view, partly in section, of a portion of a conventional coffee making machine showing the brew basket of the present invention supported below an upper housing of the coffee maker;

FIG. 2 is an exploded perspective view of the brew basket including the detachable handle;

FIG. 3 is a top plan view of the brew basket;

FIG. 4 is a side elevation of the brew basket;

DETAILED DESCRIPTION

Figure 5:
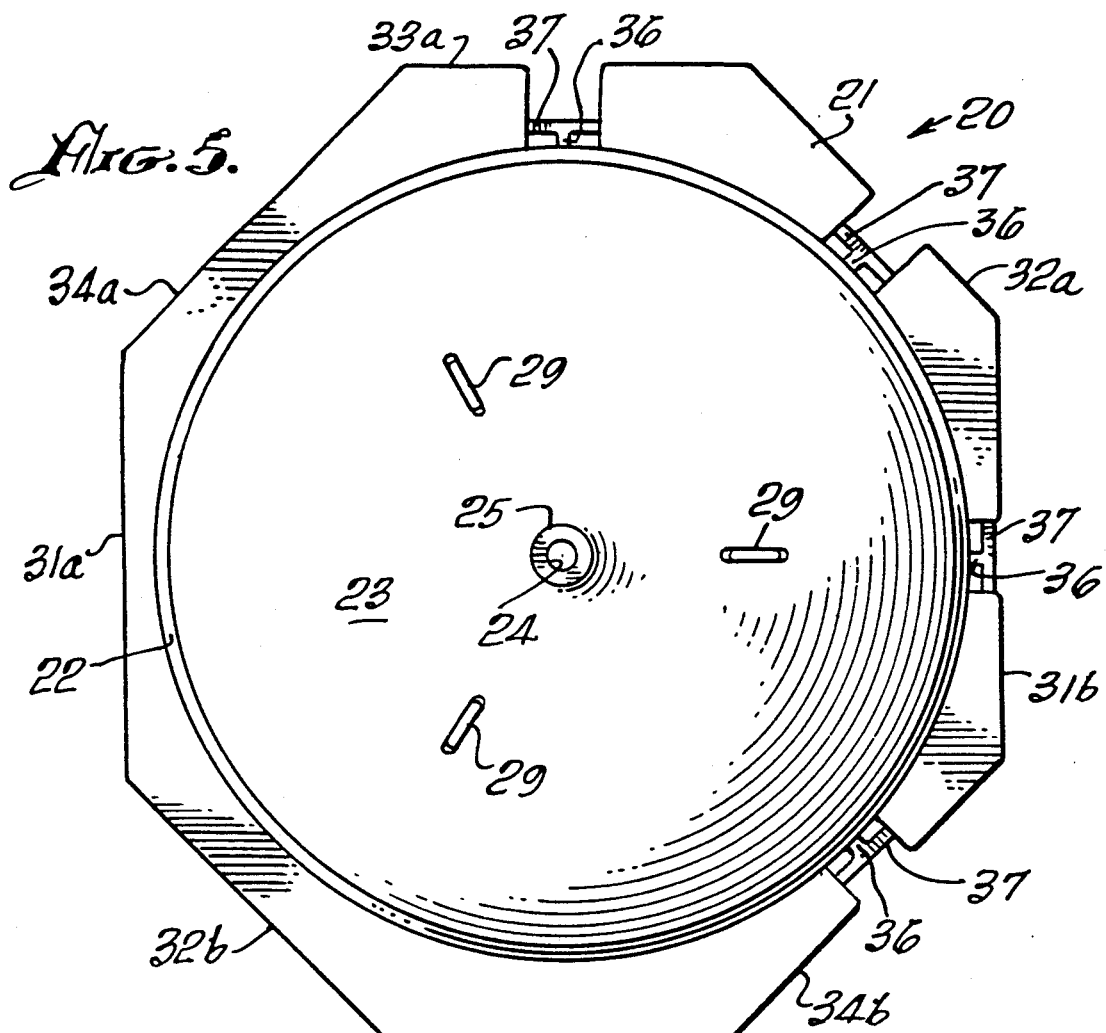
FIG. 5 is a bottom plan view of the brew basket.
Figure 6:
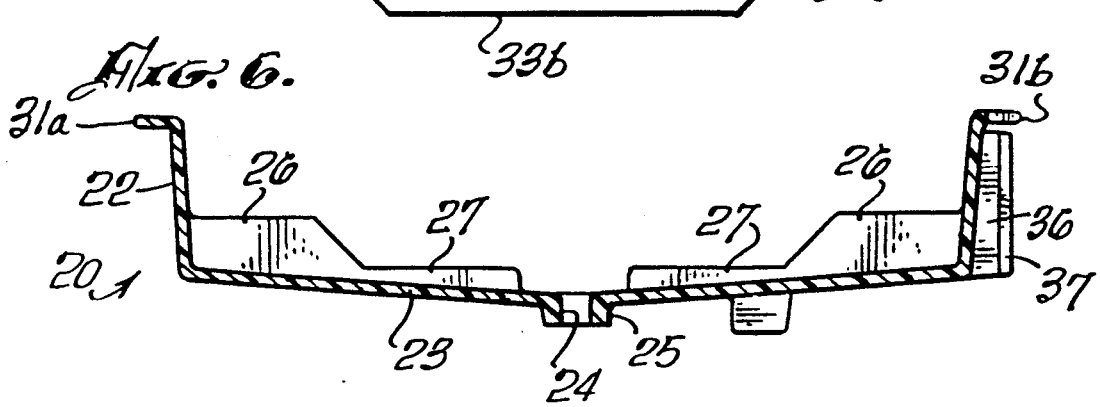
FIG. 6 is a sectional view along lines 6—6 of FIG. 3.
Figure 7:
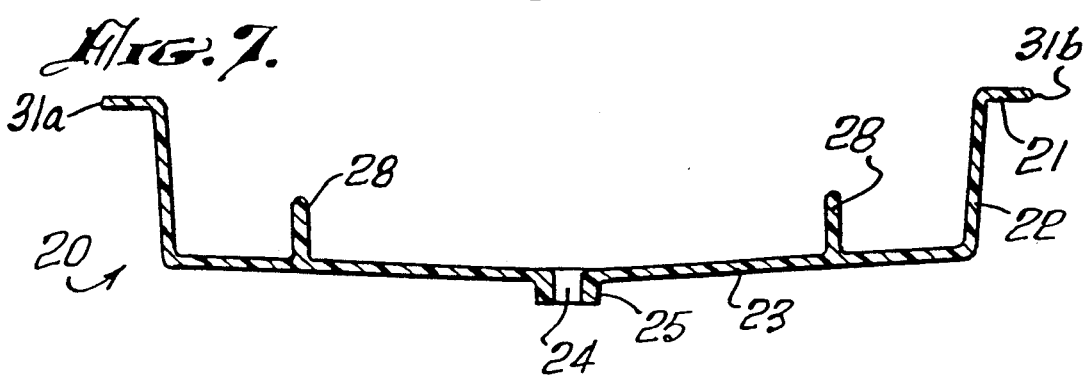
FIG. 7 is a sectional view along lines 7—7 of FIG. 3.

Referring now to the drawings, FIG. 1 shows a conventional coffee making machine 10 of the type widely used in offices and restaurants. The coffee making machines includes a base (not shown) which is provided at one end with an upright housing 11, which contains a hot water tank, the upper end of which extends into an overlying portion of a horizontal housing 12 having a bottom wall 14. Bottom wall 14 is provided with a spray head recess through which spray head 15 extends, with the spray head being positioned a short distance, typically a few millimeters, above the plane of the bottom wall. The spray head is connected by a suitable supply line to the hot water tank and discharges hot water in a downwardly diverging conical pattern. A pair of parallel guide brackets (not shown) are secured to wall 14 in spaced relation to the spray head and are adapted to support brew basket 20 by means of a lateral rim 21 on the basket so that the upper surface of the brew basket 20 abuts bottom wall 14, with to the spray head 15 being positioned over the center of the basket immediately adjacent the upper surface of the brew basket.

The brew basket 20 is configured to receive a compressed coffee water 16 loosely wrapped in filter paper. The wafer contains a predetermined quantity of roast and ground coffee sufficient to brew a full decanter of coffee of a desired strength. The quantity of ground coffee in the wafer may vary depending on the desired cup strength of the brewed coffee, the quality of the coffee used, cost considerations and the like, and will vary depending on the intended food service use of the compressed wafer. For example, it is usually preferred that coffee brewed for hotel and restaurant food service use be stronger than coffee brewed for office food service use. Consequently, compressed coffee wafers intended for use in hotels and restaurants will contain between about 50 g to 80 g of roast and ground coffee, while wafers intended for use in offices will contain slightly less coffee, typically between about 30 g to 50 g of roast and ground coffee. Preferably the roast and ground coffee is compressed in the form of a circular wafer. For use in the present invention, the compressed wafer has a thickness of between 0.5 cm to 1.3 cm, with the diameter of the wafer depending largely on the amount of coffee used. For example, coffee wafers intended for use in brewing coffee in offices, which contain between 30 g to 50 g roast and ground coffee, typically have a diameter of between 7.6 to 10.2 cm, while compressed wafers intended for use in restaurants, which contain between 50 g to 80 g roast and ground coffee, usually have a diameter of between 8.8 to 11.5 cm. The compressed coffee wafer is over wrapped in conventional filter paper, with the filter paper wrapper being sufficiently oversized to permit expansion of the ground coffee upon extraction.

Brew basket 20 includes a circular, relatively shallow, substantially vertical sidewall 22 that terminates at a bottom wall 23 which is inclined downwardly at a slight angle to a central opening 24 having a downwardly extending circumferential lip 25, through which extracted coffee beverage flows into a decanter positioned below the brew basket. As shown in the drawings the brew basket is relatively shallow in comparison to prior brew baskets, with the sidewall 22 having a narrow height in relation to its diameter. Typically the circular sidewall 22 has a height to diameter ratio of between about 0.15–0.25 to 1.

The interior of the bottom wall 23 is provided with a series of integrally formed upstanding support ribs 26 which are radially disposed around central opening 24. The ribs 26 have a substantially horizontal inner end portion 27 which receive and support the compressed coffee wafer above the bottom wall. The radial ribs 26 are formed so that the distance between the upper surface of the horizontal inner end portion 27 on which the wafer is supported, and the upper end of sidewall 22 is equal to the thickness of the coffee wafer plus 1.8 cm to 2.2 cm. That is, the upper surface of the inner end portion 27 of ribs 26 is about 2.3 cm to 3.5 cm from the upper end of sidewall 22.

A plurality of integrally formed arcuate tabs 28 are provided on the interior of the bottom wall between and substantially normal to adjacent radial ribs 26. The tabs 28 are spaced equidistant from opening 24 a distance slightly greater than the radius of the circular compressed coffee wafer disposed in the brew basket and extend upwardly from the bottom wall 23 to a point above the plane of the inner end portion 27 of ribs 26. These tabs facilitate proper positioning of the compressed wafer centrally of the brew basket directly below the spray head of the coffee maker.

A plurality of downwardly extending legs 29 are provided on bottom wall 23, with the legs extending beyond the end of lip 25. The legs, which are generally molded as part of the brew basket, support the basket on flat work surfaces or countertops.

As shown in the drawings, the brew basket 20 is configured to receive a compressed coffee wafer and is dimensioned so that when the brew basket is mounted on a conventional coffee maker, the upper surface of the compressed coffee wafer disposed in the brew basket is in such close proximity to the spray head of the coffee maker that the downwardly diverging conical spray of hot water from the spray head contacts and wets substantially the entire upper surface of the coffee wafer, including the center of the wafer. Such wetting of the entire upper surface of the coffee wafer provides increased extraction of coffee solids from the ground coffee wafer. The narrow profile of the brew basket and the use of radial support ribs which maintain the surface of the coffee wafer closely adjacent the upper end of the brew basket both contribute to the effectiveness of the present invention in providing improved extraction of brewed coffee from compressed wafers.

In addition, the brew basket is dimensioned so that the rate of flow of brewed coffee out of the basket is slightly less than the rate of incoming extraction water, thereby creating a water level in the basket sufficient to at least partially submerge the coffee wafer in the extraction water and retain a body of water in the brew basket sufficiently long to enhance extraction of coffee solids from the compressed wafer. To effect this, the opening 24 in the bottom wall is dimensioned to have an orifice diameter (about 0.5 cm) to create an extraction water level in the brew basket sufficient to partially submerge the coffee wafer.

A support flange or rim 21 extends outwardly from the top circumferential edge of sidewall 22, with the rim serving to support the brew basket in spaced guide brackets on the bottom wall 14 of the coffee maker 10 directly below the spray head. The rim preferably is polygonal in shape having an even number (usually 4, 6 or 8) of opposed parallel side edges such as 31a and b, 32a and b, 34a and b in FIG. 3. Opposing side edges (e.g. 31a and b) are parallel and are adapted to be inserted in the spaced guide brackets of the coffee maker. The pairs of opposing side edges differ in width to enable the brew basket to be used on various types, brands and sizes of coffee makers used in offices and restaurants.

For ease of handling, the brew basket may be provided with a handle 35 so that the brew basket may easily be secured to and removed form the coffee maker. While the handle may be integrally formed with the brew basket, it preferably is removably attached to the side wall 22 of the brew basket at one of the pairs of opposing side edges of the flange 21 to facilitate use of the brew basket on various types, sizes and brands of coffee makers. In accordance with this embodiment, the sidewall 22 of the brew basket is provided with engagable means for attachment of a removable handle 35. As best shown in FIG. 2, in which the flange 21 of the brew basket has 4 pairs of opposing side edges, such engagable means are provided at one of each of the opposing pairs of side edges, and include a rib 36 which is integrally formed with the sidewall and project outwardly, perpendicular to the sidewall. A laterally extending flange 37 is integrally formed at the outer end of rib 36 and extends beyond both sides of the rib. The rib and flange are adapted to be slidably received in a channel 38 formed at the inner end of handle 35 to removably secure the handle to the brew basket at one of the four pairs of opposing side edges.

The brew basket preferably is injection molded from a suitable plastic material, such as polypropylene, in known manner. The brew basket may, if desired, also be made of other suitable materials such as stainless steel or a combination of metal and plastic.

As disclosed herein above, the brew basket of the present invention is configured to receive a compressed circular wafer of ground coffee loosely overwrapped in filter paper and is dimensioned to place the upper surface of the compressed wafer in such close proximity to the spray head of the coffee maker that hot extraction water from the spray head contacts and wets substantially the entire upper surface of the coffee wafer, including the center of the wafer. This is achieved when the upper surface of the compressed wafer is positioned from the spray head a distance equal to 0.20–0.25 times the diameter of the wafer. Additional extraction efficiency is achieved by having the coffee wafer at least partially submerged in hot extraction water. As a result, the brew basket of this invention provides a higher level of extraction of coffee solids from compressed coffee wafer than is achieved with conventional brew baskets, and provides a significant reduction in time required to brew coffee of a desired strength.

In an exemplary embodiment, a compressed coffee wafer containing about 37.0 g roast and ground coffee, and having a diameter of 8.75 cm and a thickness of about 0.8 cm is used, with the wafer being wrapped in oversized filter paper. The brew basket is formed of injection molded polypropylene. The brew basket has a sidewall 22 having a diameter of 15.5 cm and a height of 3 cm. Bottom wall 23 slopes downwardly from the sidewall at an angle of about 5° to opening 24, which is 0.5 cm in diameter. Arcuate tabs 28 integrally formed on the bottom wall define a circle having a diameter of 10 cm, and the radial ribs 26 are also integrally formed in the bottom wall, with the upper surface of the inner end portion 27 of the ribs being 2.8 cm from the upper end of the sidewall 22. These foregoing dimensions are provided for the purpose of describing an exemplary embodiment and are not to be construed as limitations to the wide range of equivalents the invention encompasses. When the compressed wafer is placed on inner end portion 27 of the ribs, the upper surface of the wafer is 2.0 cm from the upper end of sidewall 22, and is in close proximity to the spray head when the brew basket is mounted on a coffee maker.

What is claimed is:

1. A brew basket for a compressed wafer of roast and ground coffee for use in a coffee making machine having a spray head from which hot extraction water is discharged into the brew basket, which comprises
    a circular upstanding sidewall which terminates at an upper circumferential edge, the sidewall having a rim extending outwardly around said upper circumferential edge for engagement with support means on said coffee making machine,
    a bottom wall integral with said sidewall having an opening extending therethrough, with the bottom wall sloping downwardly from the sidewall toward the opening,
    a plurality of radially extending upstanding ribs integral with the upper side of said bottom wall surrounding said opening, said ribs having a substantially horizontal inner end portion adjacent said opening adapted to support a compressed coffee wafer, with said ribs being dimensioned to position the upper surface of the compressed coffee wafer supported on the ribs in close proximity to the upper circumferential edge of the brew basket, and
    a plurality of upstanding arcuate tabs on the upper side of said bottom wall between the normal to adjacent radial ribs, said tabs being positioned intermediate the opening and the circumferential sidewall and spaced equidistant from said opening.

2. The brew basket defined in claim 1 in which said ribs are dimensioned to position the upper surface of the compressed wafer between about 1.8 cm to 2.2 cm from the upper edge of the brew basket sidewall.

3. The brew basket defined in claim 1 in which the upper surface of the inner end portion of said ribs is between about 2.3 cm to 3.5 cm from the upper edge of the brew basket sidewall.

4. The brew basket defined in claim 1 in which the brew basket has a narrow profile, with the circular sidewall having a height to diameter ratio of between about 0.15–0.25:1.

5. The brew basket defined in claim 1 in which the arcuate tabs extend above the plane of the inner end portion of the ribs.

6. The brew basket defined in claim 1 in which the sidewall of the brew basket has a lateral flange extending outwardly around said upper circumferential edge, said flange having a polygonal outer edge having an even number of opposed parallel side edges, with pairs of opposed side edges differing in width.

7. The brew basket defined in claim 6 in which a removable handle is slidably mounted on the sidewall of the brew basket at one of the pairs of opposing side edges of the flange.

* * * * *